(12) United States Patent
Muck

(10) Patent No.: US 11,065,926 B2
(45) Date of Patent: Jul. 20, 2021

(54) COVER ASSEMBLIES TO PREVENT UNAUTHORIZED ACCESS TO HITCH ASSEMBLIES OF A VEHICLE

(71) Applicant: Toyota Motor Engineering & Manufacturing North America, Inc., Plano, TX (US)

(72) Inventor: Todd R. Muck, Fowlerville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 218 days.

(21) Appl. No.: 16/507,423

(22) Filed: Jul. 10, 2019

(65) Prior Publication Data

US 2021/0008937 A1 Jan. 14, 2021

(51) Int. Cl.
*B60D 1/60* (2006.01)

(52) U.S. Cl.
CPC ...................... *B60D 1/60* (2013.01)

(58) Field of Classification Search
CPC .................. B60D 1/60; B60D 1/605
See application file for complete search history.

(56) References Cited

U.S. PATENT DOCUMENTS

| | | | |
|---|---|---|---|
| 3,782,761 A | 1/1974 | Cardin, Sr. | |
| 5,421,601 A * | 6/1995 | Hinze | B60D 1/60 280/507 |
| 5,560,631 A * | 10/1996 | Salvo | B60D 1/60 280/507 |
| 6,412,806 B1 * | 7/2002 | Peacock | B60D 1/60 150/166 |
| 6,874,806 B1 * | 4/2005 | Blake | B60D 1/485 150/166 |
| 6,910,705 B1 * | 6/2005 | Harwood | B60D 1/60 280/507 |
| 6,945,551 B2 | 9/2005 | Blake | |
| 6,971,663 B1 * | 12/2005 | Blake | B60D 1/60 280/155 |
| 9,033,358 B1 | 5/2015 | Williamson | |
| 9,731,570 B1 | 8/2017 | Rodriguez | |
| 2003/0189313 A1 | 10/2003 | Sievers | |
| 2006/0181060 A1 | 8/2006 | Bussiere et al. | |
| 2009/0322061 A1 | 12/2009 | Rodriguez | |

* cited by examiner

*Primary Examiner* — Kevin Hurley
(74) *Attorney, Agent, or Firm* — Dinsmore & Shohl LLP

(57) ABSTRACT

A cover assembly for a hitch assembly includes a cover and a cover lock assembly. The cover is coupled to the body component for movement between an open position and a closed position. In the open position, the cover permits access to a hitch lock assembly configured to secure a hitch to a hitch receiver and in the closed position, the cover inhibits access to the hitch lock assembly. The cover lock assembly is configured to releasably secure the cover to the hitch receiver when the cover is in the closed position. The cover lock assembly includes a locked configuration and an unlocked configuration. In the locked configuration, the cover is inhibited from moving from the closed position to the open position. In the unlocked configuration, the cover is permitted to move from the closed position to the open position.

15 Claims, 3 Drawing Sheets

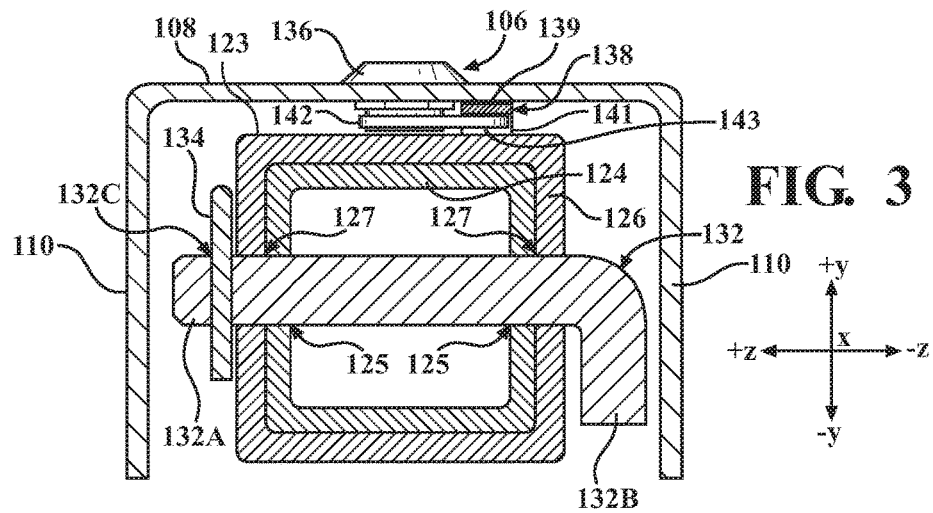
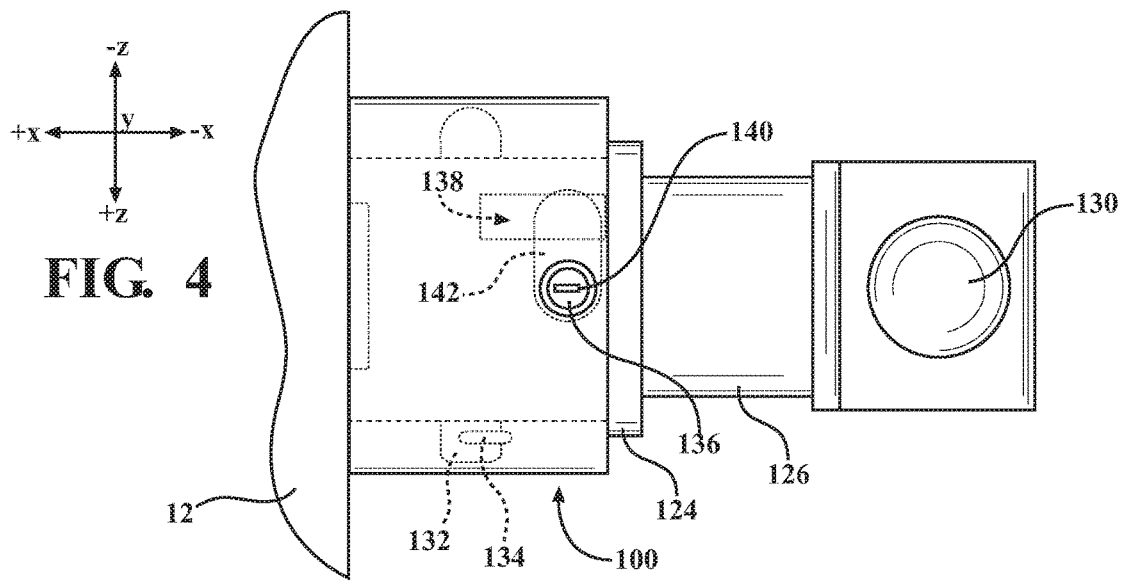
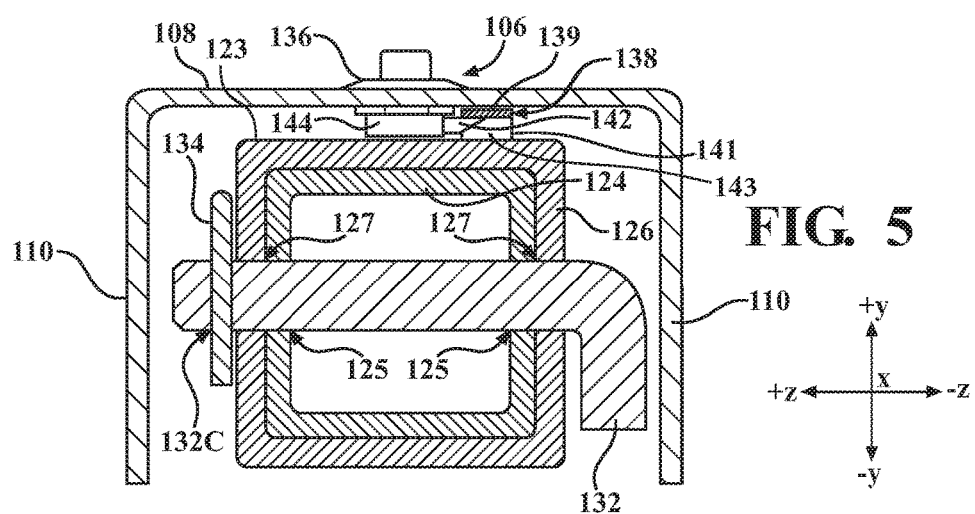

COVER ASSEMBLIES TO PREVENT UNAUTHORIZED ACCESS TO HITCH ASSEMBLIES OF A VEHICLE

TECHNICAL FIELD

The present specification generally relates to cover assemblies for hitch assemblies and, more specifically, cover assemblies to prevent unauthorized access to hitch lock assemblies of vehicle hitch assemblies.

BACKGROUND

There are currently vehicle hitch assemblies that include a hitch receiver coupled to a body component of a vehicle. The hitch receiver is configured to receive a hitch. These vehicle hitch assemblies also include a hitch lock assembly to secure the hitch to the hitch receiver. The hitch lock assembly keeps the hitch connected to the hitch receiver while the vehicle is towing a trailer connected to the hitch. However, when a hitch is connected to a hitch receiver, access to the hitch lock assembly is not restricted.

Accordingly, a need exists for devices that prevent unauthorized access to hitch lock assemblies.

SUMMARY

In accordance with one embodiment, a cover assembly is provided. The cover assembly is for a hitch assembly. The hitch assembly includes a hitch receiver coupled to a body component of a vehicle and a hitch lock assembly. The hitch receiver is configured to receive a hitch. The hitch lock assembly is configured to secure the hitch to the hitch receiver. The cover assembly includes a cover and a cover lock assembly. The cover is coupled to the body component for movement between an open position and a closed position. In the open position, the cover permits access to the hitch lock assembly. In the closed position, the cover inhibits access to the hitch lock assembly. The cover lock assembly is configured to releasably secure the cover to the hitch receiver when the cover is in the closed position. The cover lock assembly includes a locked configuration and an unlocked configuration. In the locked configuration, the cover is inhibited from moving from the closed position to the open position. In the unlocked configuration, the cover is permitted to move from the closed position to the open position.

In accordance with another embodiment, a hitch assembly for a vehicle that includes a body component is provided. The hitch assembly includes a hitch, a hitch receiver, a hitch lock assembly, a cover, and a cover lock assembly. The hitch receiver is coupled to the body component of the vehicle and is configured to receive the hitch. The hitch lock assembly is configured to releasably lock the hitch to the hitch receiver. The cover is coupled to the body component for movement between an open position and a closed position. In the open position, the cover permits access to the hitch lock assembly, and in the closed position, the cover inhibits access to the hitch lock assembly. The cover lock assembly is configured to releasably secure the cover to the hitch receiver when the cover is in the closed position. The cover lock assembly includes a locked configuration and an unlocked configuration. In the locked configuration, the cover is inhibited from moving from the closed position to the open position. In the unlocked configuration, the cover is permitted to move from the closed position to the open position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 schematically depicts a partial cross-sectional view of the cover assembly taken along the lines 3-3 of FIG. 2, according to one or more embodiments shown and described herein;

FIG. 4 schematically depicts a partial top view of the cover assembly of FIG. 3 with a cover lock assembly in a locked configuration, according to one or more embodiments shown and described herein; and FIG. 5 schematically depicts a partial cross-sectional view of the cover assembly of FIG. 3 with a cover lock assembly, according to one or more embodiments.

DETAILED DESCRIPTION

Figure 1:
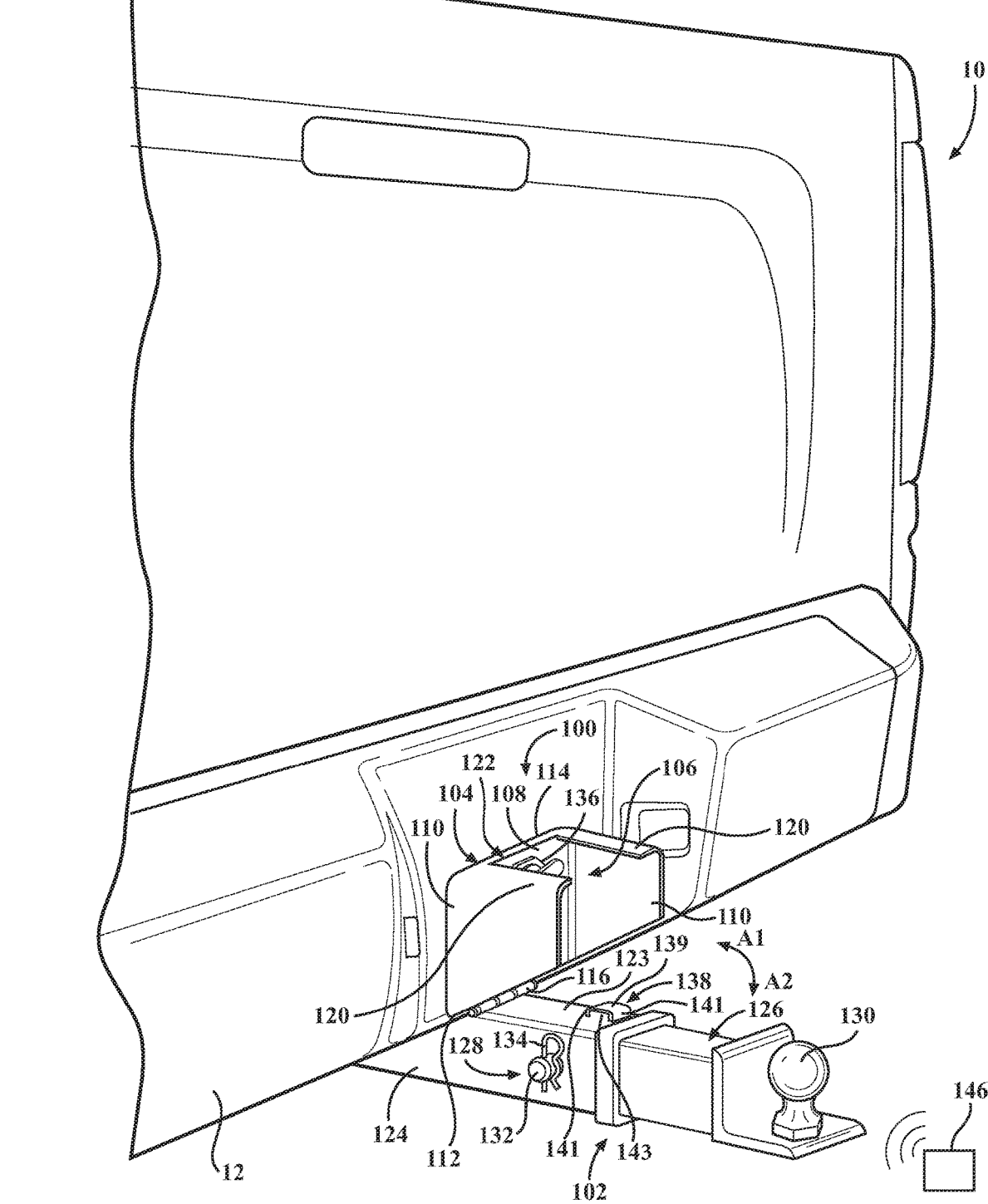
FIG. 1 schematically depicts a perspective view of a rear portion of a vehicle having a cover assembly for a hitch assembly with a cover in an open position, according to one or more embodiments shown and described herein.

Vehicles according to the present specification include a cover assembly for a hitch assembly. A hitch assembly may be used to tow a trailer. A hitch assembly may include a hitch receiver, a hitch, and a hitch lock assembly. The hitch is coupled to the hitch receiver, and the hitch assembly may be attached to a vehicle. The hitch lock assembly may be used to secure the hitch to the hitch receiver. A trailer may then be coupled to the hitch such that the trailer may be towed by the vehicle. However, once the vehicle and the trailer are parked, the hitch lock assembly is accessible to unauthorized users, which may be problematic. Accordingly, the cover assembly disclosed herein inhibits unauthorized access to the hitch lock assembly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

As used herein, the term "vehicle longitudinal direction" refers to the forward-rearward direction of the vehicle (i.e., in the +/−vehicle X-direction as depicted). The term "vehicle lateral direction" refers to the cross-vehicle direction of the vehicle (i.e., in the +/−vehicle Z-direction as depicted), and is transverse to the vehicle longitudinal direction. The term "vehicle vertical direction" refers to the upward-downward direction of the vehicle (i.e., in the +/−vehicle Y-direction as depicted). As used herein, "upper" and "above" are defined as the positive Y direction of the coordinate axis shown in the drawings. As used herein, "lower" and "below" are defined as the negative Y direction of the coordinate axis shown in the drawings. Further, the terms "outboard" as used herein refers to the relative location of a component with respect to a vehicle centerline. The term "inboard" as used herein refers to the relative location of a component with respect to the vehicle centerline. Because the vehicle structures may be generally symmetrical about the vehicle centerline, the direction to which use of terms "inboard" or "outboard" and refer may be mirrored about the vehicle centerline when evaluating components positioned along opposite sides.

Referring to FIG. 1, a vehicle 10 is generally depicted. In some embodiments, the vehicle 10 is a truck, such as a pickup truck. In some other embodiments, the vehicle 10 is a car, a sports utility vehicle, a van, or other types of vehicles which are provided to tow a trailer, or attach an accessory such as a bicycle rack. The vehicle 10 includes a body component 12, a cover assembly 100 for a hitch assembly 102 coupled to the body component 12. In some embodiments, the body component 12 is a rear bumper, a rear bumper reinforcement, or a rear frame of the vehicle 10.

Figure 2:
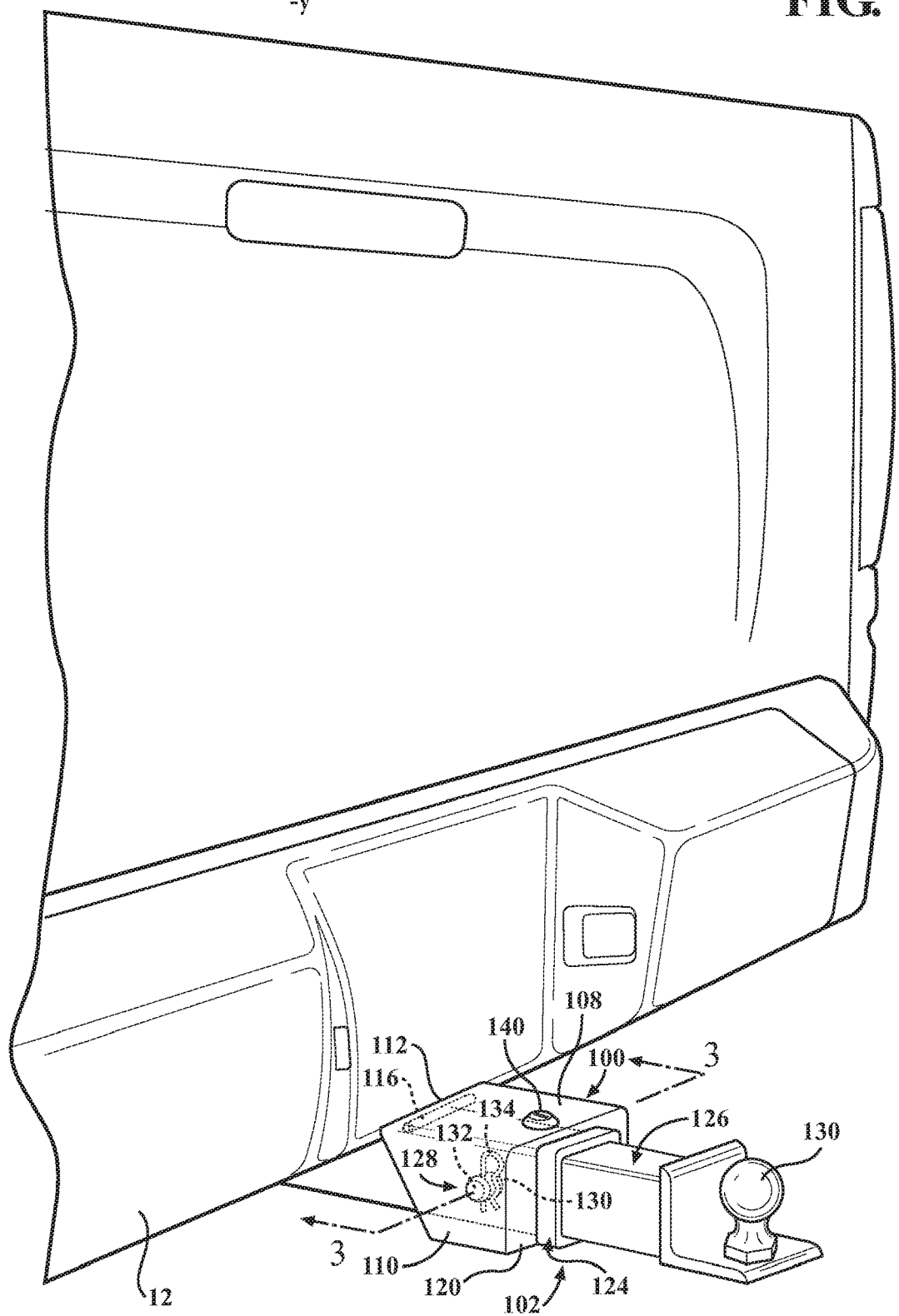
FIG. 2 schematically depicts a perspective view of the rear portion of the vehicle having the cover assembly of FIG. 1 with the cover in a closed position, according to one or more embodiments shown and described herein.

The cover assembly 100 includes a cover 104 and a cover lock assembly 106. The cover 104 includes a base wall 108 and a pair of sidewalls 110 that extend normally from the base wall 108. The base wall 108 has a proximate end 112 and an opposite distal end 114. A hinge 116 is connected to the proximate end 112 of the base wall 108 and the body component 12 of the vehicle 10 such that the hinge 116 couples the base wall 108 to the body component 12. The hinge 116 is configured such that the cover 104 may be pivoted between an open position, as shown in FIG. 1, and a closed position, as shown in FIG. 2. The sidewalls 110 each have a distal edge 120 that extends generally normal to the sidewalls 110. The distal end 114 of the base wall 108 and the distal edges 120 of the sidewalls 110 define an open end 122 of the cover 104.

Still referring to FIG. 1, the hitch assembly 102 includes a hitch receiver 124, a hitch 126, a hitch lock assembly 128. The hitch receiver 124 is connected to the body component 12 of the vehicle 10. In some embodiments, the hitch receiver 124 is manufactured as part of the vehicle 10. In other embodiments, the hitch receiver 124 may be connected to the body component 12 of the vehicle 10 by a user after the vehicle 10 is manufactured. In some embodiments, the hitch receiver 124 is connected to the same body component 12 as the hinge 116. In other embodiments, the hitch receiver 124 may be connected to a different body component than the hinge 116.

An end portion of the hitch 126 has a tow ball 130. A trailer may be coupled to the tow ball 130 to connect the trailer to the vehicle 10. The hitch receiver 124 may receive the hitch 126. The hitch receiver 124 has hitch receiver openings 125 on either side, as shown in FIGS. 3 and 5. The hitch 126 has corresponding hitch openings 127 on either side. When the hitch receiver 124 receives the hitch 126, the hitch receiver openings 125 align with the hitch openings 127.

The hitch lock assembly 128 includes a lock pin 132 and a retainer clip 134. The lock pin 132 may have an elongated leg 132A and an arm 132B that extends generally normal from the leg 132A to generally form an L-shape. The lock pin 132 may extend through the hitch receiver openings 125 and the hitch openings 127 when the hitch 126 is positioned within the hitch receiver 124. In some embodiments, the lock pin 132 has an opening 132C on a distal end of the leg 132A. The opening 132C is configured to receive the retainer clip 134, such as a cotter pin. When the lock pin 132 is extended through the hitch receiver openings 125 and the hitch openings 127, the lock pin 132 inhibits the hitch 126 and the hitch receiver 124 from moving in the vehicle longitudinal direction relative to each other, thereby securing the hitch 126 within the hitch receiver 124. When the retainer clip 134 is extended through the opening 132C in the lock pin 132, the retainer clip 134 inhibits the lock pin 132 from moving in the vehicle lateral direction relative to the hitch 126 and the hitch receiver 124, thereby securing the lock pin 132 within the hitch 126 and the hitch receiver 124.

The cover lock assembly 106 includes a lock engagement portion 136 and a lock connection portion 138. In the illustrated embodiment, the lock engagement portion 136 is connected to the base wall 108 and the lock connection portion 138 is connected to an upper surface 123 of the hitch receiver 124. In other embodiments, the lock connection portion 138 is connected to the base wall 108 and the lock engagement portion 136 is connected to the upper surface 123 of the hitch receiver 124.

The cover lock assembly 106 includes a locked configuration and an unlocked configuration. In the unlocked configuration, the cover 104 is free to move between the open position and the closed position. In the locked configuration, the cover 104 is inhibited from moving from the closed position to the open position.

As best shown in FIG. 4, the lock engagement portion 136 comprises a key hole 140 and a latch 142. The key hole 140 may receive a key (not shown). When the appropriate key is inserted into the key hole 140, the key may be turned to rotate the latch 142 between an engaged position and a disengaged position. In the illustrated embodiment, the latch 142 rotates 90 degrees between the engaged position and the disengaged position.

In the illustrated embodiment, the lock connection portion 138 extends away from the upper surface 123 of the hitch receiver 124. The lock connection portion 138 has a U-shaped surface comprising a base wall 139 and two sidewalls 141, which defines a slot 143 with the upper surface 123, through which the latch 142 may extend when the lock engagement portion 136 is in the engaged position. Accordingly, when the lock engagement portion 136 is in the disengaged position, the cover lock assembly 106 is in the unlocked configuration in which the cover 104 may be moved between the open position and the closed position as the latch 142 is disengaged with the slot 143 of the lock connection portion 138. When the cover 104 is in the closed position, the lock engagement portion 136 may be moved from the disengaged position to the engaged position, thereby causing the latch 142 to be positioned within the slot 143 of the lock connection portion 138 and putting the cover lock assembly 106 into the locked configuration, which inhibits the cover 104 from moving to the open position.

In another embodiment, the lock connection portion 138 may include an opening sized and shaped to receive the latch 142 when the lock engagement portion 136 is in the disengaged position and to not receive the latch 142 when the lock engagement portion 136 is in the engaged position. In this embodiment, the latch 142 may be elongated in a predetermined direction, as shown in FIG. 4, with a similar shape as the opening in the lock connection portion 138. Thus, the latch 142 may freely pass through the lock connection portion 138 when the latch 142 and the lock connection portion 138 are aligned while being prohibited from passing through the lock connection portion 138 when they are misaligned.

In another embodiment, the cover lock assembly 106 may include an electronically controlled actuator 144 to move the lock engagement portion 136 between the engaged position and the disengaged position. The electronically controlled actuator 144 may be operated by a mobile computing device 146 (e.g., key fob as part of a remote keyless entry system or a smartphone) as shown in FIG. 1. In other embodiments, the cover lock assembly 106 may comprise other types of locking mechanisms configured to releasably lock one component to another.

In operation, to attach the hitch 126, the cover 104 may be in the open position. The hitch 126 may then be inserted into the hitch receiver 124, the lock pin 132 may be inserted through the hitch receiver 124, and the retainer clip 134 may be inserted through the lock pin 132. Then, to prevent unauthorized access to the hitch lock assembly 128, the cover 104 may be moved to the closed position. In the closed position, the sidewalls 110 of the cover 104 extend below the body component 12 in the vehicle vertical direction and extend over the hitch receiver openings 125 and the hitch openings 127, thereby inhibiting the lock pin 132 from being removed from the hitch receiver 124 and hitch 126, as best shown in FIG. 3.

Once the cover 104 is in the closed position, the cover lock assembly 106 may be moved from the unlocked configuration to the locked configuration. In the locked configuration, the latch 142 of the lock engagement portion 136 is positioned within the slot 143 defined by the lock connection portion 138. Thus, in the locked configuration, the lock engagement portion 136 and the lock connection portion 138 are engaged with each other such that the lock engagement portion 136 is inhibited from moving in the vehicle vertical direction. Consequently, in the locked configuration, the cover 104 is inhibited from moving from the closed position to the open position. As the lock pin 132 is inhibited from being removed from the hitch receiver 124 and the hitch 126, the hitch 126 is inhibited from being removed from the hitch receiver 124. Accordingly, when the cover 104 is in the closed position and the cover lock assembly 106 is in the locked configuration, unauthorized access to the hitch lock assembly 128 is prevented.

While particular embodiments have been illustrated and described herein, it should be understood that various other changes and modification may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed:

1. A cover assembly for a hitch assembly that includes a hitch receiver coupled to a body component of a vehicle, the hitch receiver configured to receive a hitch, and a hitch lock assembly configured to secure the hitch to the hitch receiver, the cover assembly comprising:
   a cover coupled to the body component for movement between an open position and a closed position, in the open position the cover permits access to the hitch lock assembly, and in the closed position the cover inhibits access to the hitch lock assembly; and
   a cover lock assembly configured to releasably secure the cover to the hitch receiver when the cover is in the closed position, the cover lock assembly includes a locked configuration and an unlocked configuration, in the locked configuration the cover is inhibited from moving from the closed position to the open position, and in the unlocked configuration the cover is permitted to move from the closed position to the open position.

2. The cover assembly of claim 1, wherein the cover includes a base wall and a hinge that couples the base wall to the body component, the hinge configured to move the cover between the open position and the closed position.

3. The cover assembly of claim 2, wherein the cover includes a pair of sidewalls that extend generally normal from the base wall such that when the cover is in the closed position the hitch lock assembly is positioned between the pair of sidewalls to inhibit access to the hitch lock assembly.

4. The cover assembly of claim 3, wherein the base wall includes a proximate end and an opposite distal end, the hinge couples the proximate end of the base wall to the body component.

5. The cover assembly of claim 4, wherein each of the pair of sidewalls includes a distal edge, and the distal end of the base wall and the distal edges of the pair of sidewalls defines an open end of the cover, the open end of the cover configured to receive at least a portion of the hitch receiver when the cover is in the closed position.

6. The cover assembly of claim 3, wherein the cover lock assembly includes a lock engagement portion coupled to one of the base wall and the hitch receiver and a lock connection portion coupled to the other of the base wall and the hitch receiver.

7. The cover assembly of claim 6, wherein the lock engagement portion is moveable between an engaged position and a disengaged position, in the engaged position the lock engagement portion engages with the lock connection portion such that the cover lock assembly is in the locked configuration to inhibit movement of the cover from the closed position to the open position, and in the disengaged position the lock engagement portion disengages with the lock connection portion such that the cover lock assembly is in the unlocked configuration to permit movement of the cover from the closed position to the open position.

8. The cover assembly of claim 7, wherein the lock engagement portion is provided on the base wall of the cover and the lock connection portion is provided on an upper surface of the hitch receiver.

9. The cover assembly of claim 8, wherein the lock engagement portion is configured to receive a key to move the cover lock assembly between the locked configuration and the unlocked configuration.

10. The cover assembly of claim 7, wherein the cover lock assembly includes an electronically controlled actuator configured to move the lock engagement portion between the engaged position and the disengaged position to move the cover lock assembly between the locked configuration and the unlocked configuration.

11. A hitch assembly for a vehicle that includes a body component, the hitch assembly comprising:
    a hitch;
    a hitch receiver coupled to a body component, the hitch receiver configured to receive the hitch;
    a hitch lock assembly configured to releasably lock the hitch to the hitch receiver;
    a cover coupled to the body component for movement between an open position and a closed position, in the open position the cover permits access to the hitch lock assembly, and in the closed position the cover inhibits access to the hitch lock assembly; and
    a cover lock assembly configured to releasably secure the cover to the hitch receiver when the cover is in the closed position, the cover lock assembly includes a locked configuration and an unlocked configuration, in the locked configuration the cover is inhibited from moving from the closed position to the open position, and in the unlocked configuration the cover is permitted to move from the closed position to the open position.

12. The hitch assembly of claim 11, wherein the cover includes a base wall, a pair of sidewalls, and a hinge that couples the base wall to the body component, the hinge configured to move the cover between the open position and the closed position, the pair of sidewalls extend generally normal from the base wall such that when the cover is in the closed position the hitch lock assembly is positioned between the pair of sidewalls to inhibit access to the hitch lock assembly.

13. The hitch assembly of claim 12, wherein the cover lock assembly includes a lock engagement portion coupled to one of the base wall and the hitch receiver and a lock connection portion coupled to the other of the base wall and the hitch receiver, wherein the lock engagement portion is moveable between an engaged position and a disengaged position, in the engaged position the lock engagement portion engages with the lock connection portion such that the cover lock assembly is in the locked configuration to inhibit movement of the cover from the closed position to the open position, and in the disengaged position the lock engagement portion disengages with the lock connection portion such that the cover lock assembly is in the unlocked configuration to permit movement of the cover from the closed position to the open position.

14. The hitch assembly of claim 13, wherein the lock engagement portion is configured to receive a key to move the cover lock assembly between the locked configuration and the unlocked configuration.

15. The hitch assembly of claim 13, wherein the cover lock assembly includes an electronically controlled actuator configured to move the lock engagement portion between the engaged position and the disengaged position to move the cover lock assembly between the locked configuration and the unlocked configuration.

\* \* \* \* \*